May 19, 1931.  R. A. FORESMAN  1,806,554
STOKER
Filed Feb. 4, 1929    10 Sheets-Sheet 3

WITNESS
E. Lutz

INVENTOR
Robert A. Foresman
BY
A. B. Reeves
ATTORNEY

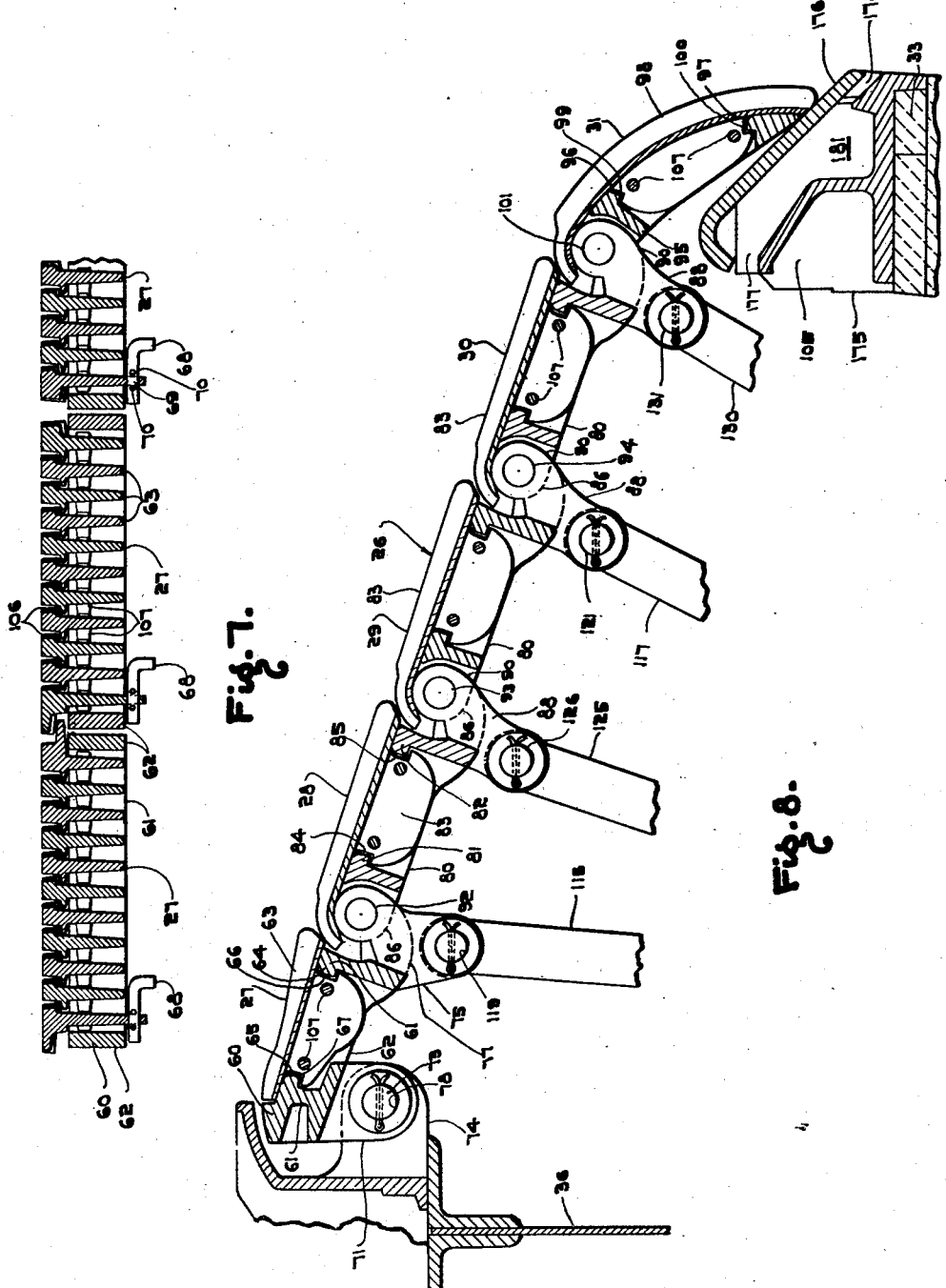

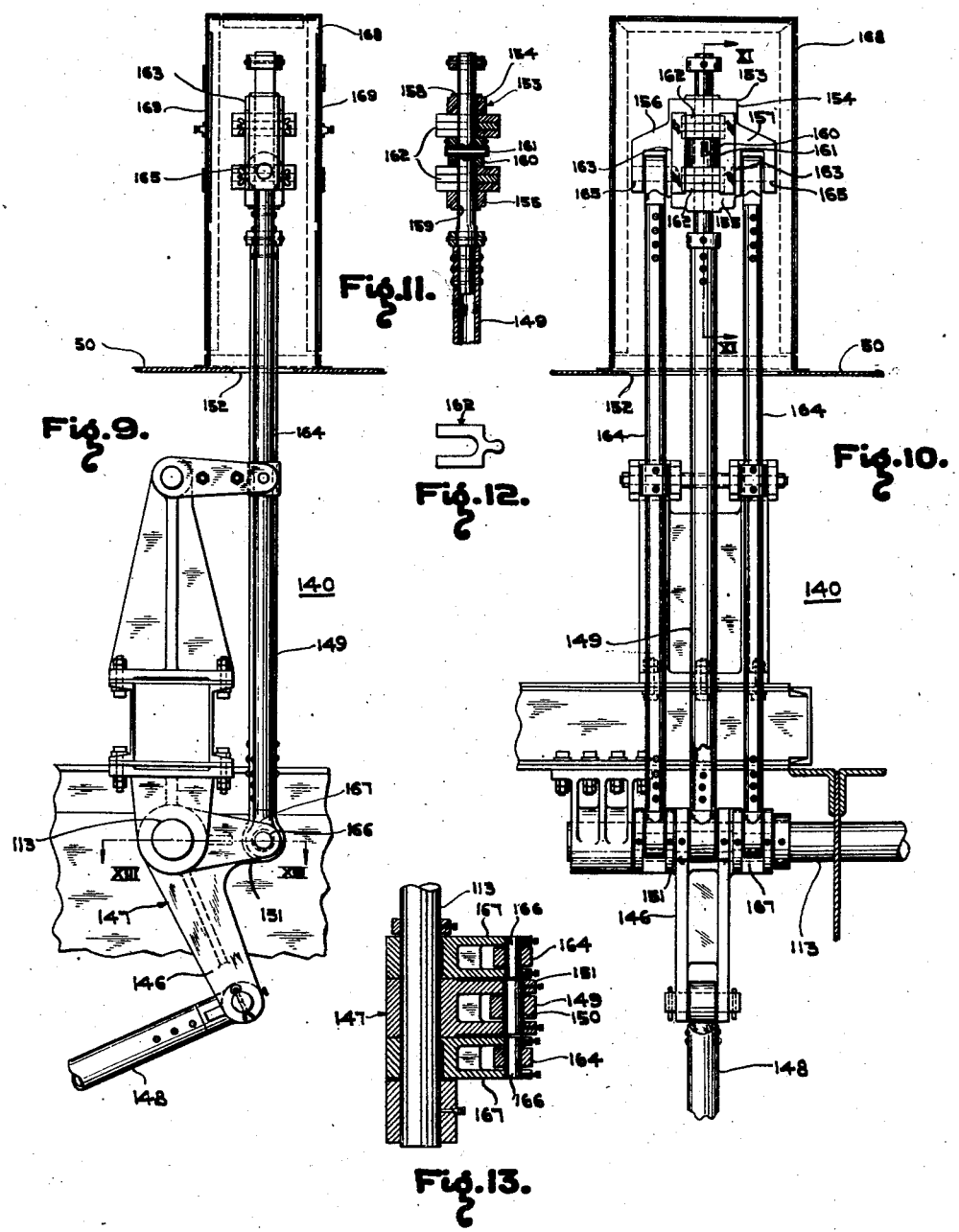

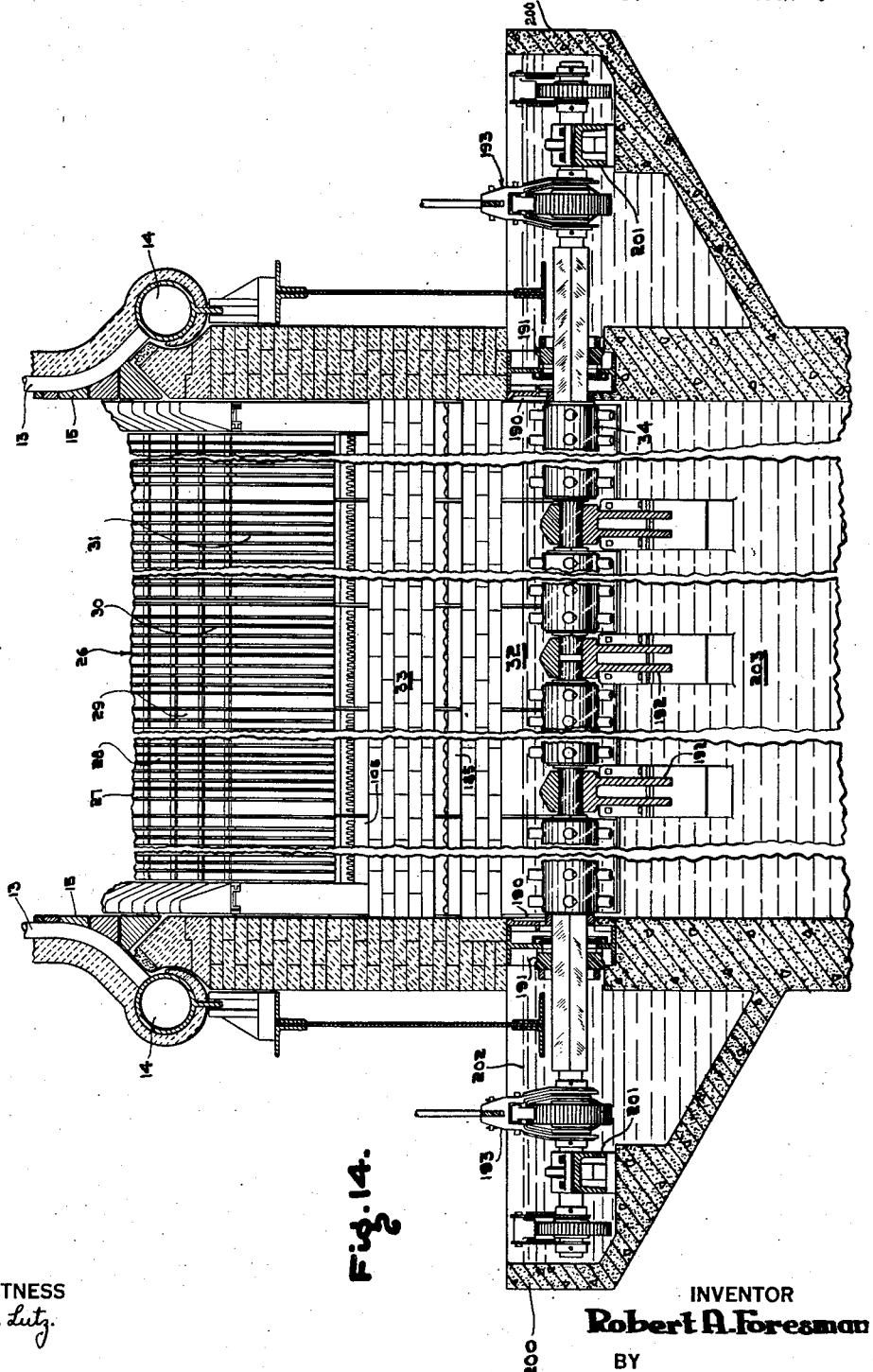

May 19, 1931. R. A. FORESMAN 1,806,554
STOKER
Filed Feb. 4, 1929 10 Sheets-Sheet 10

WITNESSES:
E. Lutz

INVENTOR
Robert A. Foresman
BY
A. B. Reavis
ATTORNEY

Patented May 19, 1931

1,806,554

UNITED STATES PATENT OFFICE

ROBERT A. FORESMAN, OF MOORES, PENNSYLVANIA, ASSIGNOR TO WESTINGHOUSE ELECTRIC & MANUFACTURING COMPANY, A CORPORATION OF PENNSYLVANIA

STOKER

Application filed February 4, 1929. Serial No. 337,445.

My invention relates to combustion apparatus and more particularly to progressive feed stokers.

As is well known, the multiple retort underfeed stoker comprises a plurality of alternately-arranged retorts and tuyère rows. During operation, the green coal is fed from suitable hoppers into the forward ends of the retorts and underneath the fuel bed by means of primary rams. Secondary rams, which are located within the retorts, force the coal longitudinally of the retorts, and at the same time upwardly toward the upper incandescent portion of the fuel bed, and also laterally from the retorts and on to the tuyère rows. During its progress, the coal is heated; the distilled gases are driven off, which gases pass through the fuel bed and are burned; coke is formed; and lastly the coke is burned.

In an efficiently operating multiple retort underfeed stoker, the air passes uniformly through the tuyère rows and upwardly through the fuel bed over them, where it combines with the coke and the distilled gases to produce perfect combustion. Although the entire upper surface of the fuel bed is incandescent, the more active combustion takes place over the tuyère rows, and the less active combustion takes place in and over the retorts where the distillation and coking of the fuel occur. An inspection of a fuel bed will reveal that it is composed of parallel light and dark lanes arranged alternately with respect to one another and extending lengthwise of the stoker. In general, the light and dark lanes lie in straight lines, and are of uniform width from front to rear of the stoker. The light lanes are over the tuyère rows and indicate more active combustion, and the dark lanes are over the retorts and indicate less active combustion.

The major portion of the resulting ash melts and filters downwardly from the incandescent surface of the fuel bed in the form of drops and tiny streams. The downwardly moving ash meets the upwardly flowing current of air from the tuyère rows, which air is at a relatively lower temperature, and as a result the ash solidifies into globules and small pieces of clinker which eventually come to rest upon the tuyère rows. The rearwardly moving fuel bed, by virtue of its frictional contact with the ash, carries this ash rearwardly along with it and eventually discharges the ash into the clinker pit or on to a dump grate, as the case may be.

As the particles of solidified ash are necessarily of widely varying size and shape, and as the ash is handled in such a non-positive manner, it is extremely difficult to maintain a uniform and even movement of this ash. It is, therefore, evident that the longer the stoker and the higher the ash content, the more unstable will be the operation of the stoker as regards to the movement of the ash. In the longer stoker, the retorts and tuyère rows are longer, and if the combustion rate per square foot of area is kept constant, more and more fuel is burned per retort, and more and more ash will therefore have to be carried along over a greater distance.

It sometimes happens that the rearwardly moving fuel is so ineffective in positively handling the ash, that certain spots, which are at varying locations over the entire fuel bed, do not have the ash removed from them sufficiently rapidly. When this happens, additional molten ash dripping downwardly from the incandescent fuel bed freezes to the hardened ash already present and eventually builds up into a large clinker.

At times, the large clinkers come to rest on top of combustible material on the stoker. As the air passing through the stoker cannot freely pass through the clinkers, the combustible underneath the clinker will burn and as a result cause the burning out of the stoker parts.

As the clinkers increase in size they become so large that the moving fuel bed is not effective in causing the movement of the clinker down the stoker and to the ash disposal apparatus. As a result of this they interfere with the uniform movement of the material over the tuyère rows, and also the movement of the streams of coal in the retorts; thereby resulting in a congested condition of the fuel bed and causing certain tuyères to burn coal more rapidly than others, which latter results in the development of a non-uniform fuel bed having relatively thick and thin spots.

The rate at which fuel is burned governs the velocity of air through the fuel bed. With a uniform air pressure under the stoker, the thin spots in the fuel bed burn coal progressively more rapidly than the thick spots. Also the thin spots offer a lesser resistance to the passage of air through the fuel bed than the thick spots. As a result, the air passes through these thin spots, or low resistance areas, in the fuel bed at extremely rapid rates.

As the resistance of the fuel bed at these thin spots decreases and the velocity of air consequently increases, eventually an air velocity is reached at which the air current is capable of lifting and carrying away the fuel from the bed. When this occurs, fuel is blown off the stoker. This blown fuel is commonly referred to as "pop-corn".

As the blown particles of fuel ascend into the furnace, the high velocity and low velocity gas streams from the low and high resistance areas, respectively, of the fuel bed, merge into a common stream having a mean velocity lower than the critical velocity which caused the lifting of the fuel. When the blown fuel particles reach this common stream, the heavier of these particles settle downward out of the gas stream and eventually gravitate to some section of the furnace at which the air velocity is insufficient to hold them in suspension. Inasmuch as the lowest air velocity is encountered over the clinker grinder pit or dump grate the heavier fuel particles tend to collect at these points. As the combustion conditions are inferior in and over the clinker pit and on a dump grate, a large amount of the combustible in the blown fuel is lost.

The lighter fuel particles do not precipitate out of the upwardly moving gas stream, but are carried through the boiler and out the stack in a relatively unburned condition, thereby resulting in a serious fuel loss, and a cinder nuisance in the neighborhood of the plant.

Obviously, an excess amount of air will flow through these spots of low resistance in the fuel bed, which entails a resultant loss in the heat required to raise the excess air to stack temperature. Furthermore, as large amounts of air pass through these spots of low resistance, the pressure of the air within the wind box below the stoker will be lowered to a certain extent, thereby resulting in the starvation of the remaining portions of the fuel bed.

As the output of any particular size of multiple retort stoker is increased, calling for an increased coal feeding rate, more and more coal passes out of the end of the retorts without spreading over the tuyère rows. Continued increase of the output and, consequently of the coal feeding rate, eventually causes the discharge of more coal from the end of the retort than can be efficiently burned. The result of this is that streams of unburned coal extend into the clinker grinder pit or on to the dump grate. To the observer, the dark and light lanes, mentioned in a previous paragraph, can be traced from the front wall of the furnace to the rear wall thereof.

As the combustion conditions in and over the clinker pit are not as good as over the tuyère rows, large portions of the combustible material present in the dark lanes will be lost in the refuse unless some effective means in provided for breaking down the dark lanes and for supplying air uniformly and in sufficient quantities to burn out the combustible. Furthermore, the inferior combustion conditions in the pit and on the dump grate result in the formation of large clinkers, which, as stated above, interfere seriously with the uniformity of the combustion operation.

Attempts to prevent this discharge of excessive quantities of coal from the retorts have been made by reducing the length of the strokes of the secondary rams in the lower ends of the retorts. This has been successful in retarding the flow of coal, but retardation of the flow of coal has also caused retardation of the flow of ash with resultant increased clinker trouble and an increased amount of blown fuel or "pop-corn".

Obviously, then, continued increases in the output of conventionally designed multiple retort underfeed stokers result in the creation of undesirable fuel bed conditions, either by the ejection of excessive quantities of coal from the ends of the retorts or by the congestion or disruption of the fuel bed caused by clinker formations.

In order to remedy the above-stated difficulties, the present-day multiple retort underfeed stokers are equipped with agitators of various designs. The purpose of these agitators is to break up the material as it comes from the ends of the retorts and permit air for supporting combustion to enter and burn out the combustible. Such constructions aid materially in the efficient burning of the fuel. However, they do not eliminate effectively the congested condition of the fuel bed, the uneven burning condition, the presence of "pop-corn", the clinker trouble, and lastly, the presence of large amounts of combustible in the ash.

The reason for this is that the agitators do not provide an effective surface for supporting and burning out the major portion of the combustible in the material before it reaches the clinker pit or the dump grate, and they do not provide for a positive and uniform movement of the fuel bed so as to relieve the congested condition on the underfeed section. Also, with these agitators, it is extremely difficult to maintain, at the lower end of the stoker, the uniform temperature condition necessary for efficient combustion.

It has also been suggested to provide overfeed grate surfaces of appreciable size at the lower end of the multiple retort underfeed stoker sections; but in so far as the applicant is aware, none of these suggestions have been incorporated in a successfully working apparatus.

According to these suggestions, the overfeed grate section receives the burning material from the underfeed section, agitates the material and provides air for supporting combustion. For the most part, these overfeed grate sections are in the form of a series of disjointed rocker grates. Obviously, such arrangements present the serious disadvantage of the sifting of the combustible through the grate surface and being lost. Also, in such arrangements, no provision is made for the positive and uniform movement of the burning fuel so as to effectively relieve the congestion condition of the fuel bed on the underfeed section.

It has also been proposed to provide a chain grate at the end of the underfeed section. However, this arrangement falls short of the desideratum, in that it does not provide for the positive agitation of the fuel during its progress and hence will not effect the complete combustion of the material.

It is therefore an object of this invention to provide an apparatus of the character designated which is of improved construction and arrangement of parts, and also to provide one which, by reason of its improved construction, will operate in an extremely efficient manner.

Another and more specific object is to provide a multiple retort underfeed stoker having at the lower end thereof an improved form of overfeed grate of appreciable size, which receives the burning material from the underfeed section; thoroughly agitates the material without serious loss due to sifting; provides for a uniform and thorough distribution of air through the material so as to burn out the combustible contained therein; and lastly provides for the positive and uniform movement of the material toward the ash discharge apparatus, thereby relieving the congestion on the underfeed section, providing a cleaner underfeed section and permitting the uniform flow of air therethrough at comparatively low wind box pressures.

A further object is to provide an improved mechanism for effecting the movement of the overfeed grate section.

A further object is to provide an overfeed grate section, the component parts of which are of improved construction and arrangement of parts.

A still further object is to provide a clinker grinder pit which is of improved construction and arrangement of parts and which is especially adapted for use with a stoker having combined underfeed and overfeed sections.

These and other objects are effected by my invention, as will be apparent from the following description and claims taken in connection with the accompanying drawings, forming a part of this application, in which:

Fig. 7 is a fragmentary transverse sectional view on the line VII—VII of Fig. 6, the grate bars being all shown as being in position within the frames;

Fig. 8 is a longitudinal sectional view through one series of grate frames, the view being taken on the line VIII—VIII of Fig. 6;

Fig. 9 is an enlarged elevational view showing a portion of the driving mechanism for the overfeed grate section which is arranged exteriorly of the furnace walls;

Fig. 10 is an elevational view of the exterior driving mechanism taken at right angles to Fig. 9;

Fig. 11 is a fragmentary sectional view taken on the line XI—XI of Fig. 10;

Fig. 12 is a detail elevational view of one of the shoes which provide a lost motion adjustment for the exterior driving mechanism;

Fig. 13 is a fragmentary sectional view taken on the line XIII—XIII of Fig. 9;

Fig. 14 is a vertical transverse sectional view taken on the line XIV—XIV of Fig. 1, showing in elevation the front wall of the clinker grinder pit, the grinder rolls, etc.;

According to the embodiment of my invention which is shown on the accompanying drawings, I provide a stoker including an underfeed section of alternately-arranged retorts and tuyère rows, and an overfeed section of appreciable size, disposed at the discharge end of the underfeed section, and providing an unbroken fuel-supporting surface for supporting the fuel during the last stages of combustion. The overfeed grate section comprises a series of movable grate members pivotally connected together in end-to-end relation and extending in the direction of fuel feed.

I also provide an improved means for supporting and moving these grate members so that some of the grate members forming the series move bodily in the direction of fuel feed and also angularly with respect to the fuel-supporting surface provided by the overfeed section. By reason of this construction, the burning material received from the underfeed section is broken up and the combustible contained therein is burned out before it reaches the ash disposal apparatus, which, according to one aspect of my invention, may be either a clinker pit or a dump grate.

The combined movement of the grate members also provides for the positive movement of the burning fuel to the ash disposal apparatus, thereby relieving any congested condition of the fuel bed on the underfeed section and permitting the ash to move uniformly down the tuyère rows with the advancing fuel bed.

The overfeed grate section is provided with a plurality of air-emitting openings for supplying a uniform amount of air to the fuel during the last stages of combustion. These openings are distributed uniformly over the entire grate surface and are disposed in close proximity to one another.

According to another aspect of my invention, I provide an improved form of clinker pit for receiving the solid products of combustion. The clinker pit consists of an immovable refractory front wall, which is cooled, and which provides a smooth, uninterrupted contacting surface for the ash moving downwardly through the pit.

Figure 1:
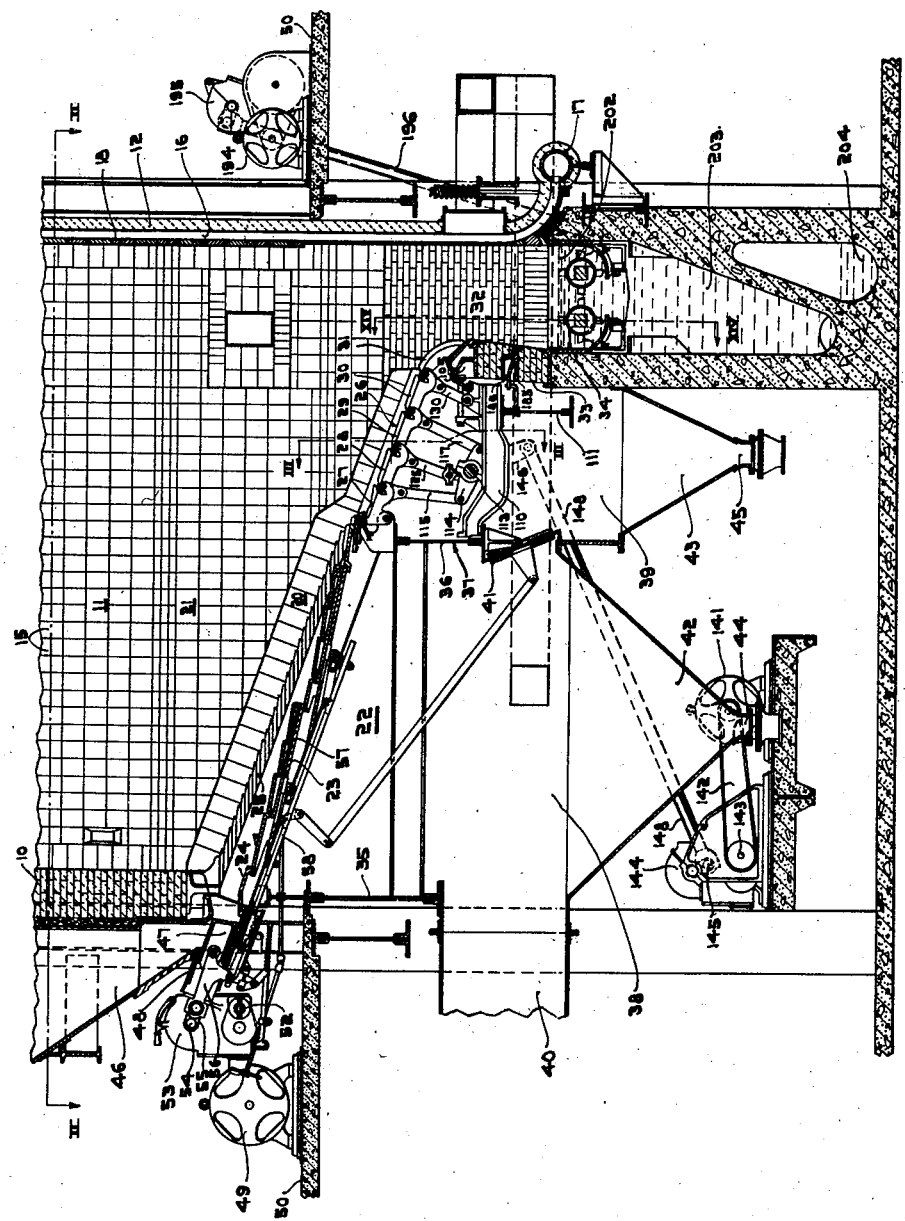
Fig. 1 is a vertical longitudinal sectional view through a furnace equipped with my improved apparatus.
Figure 2:
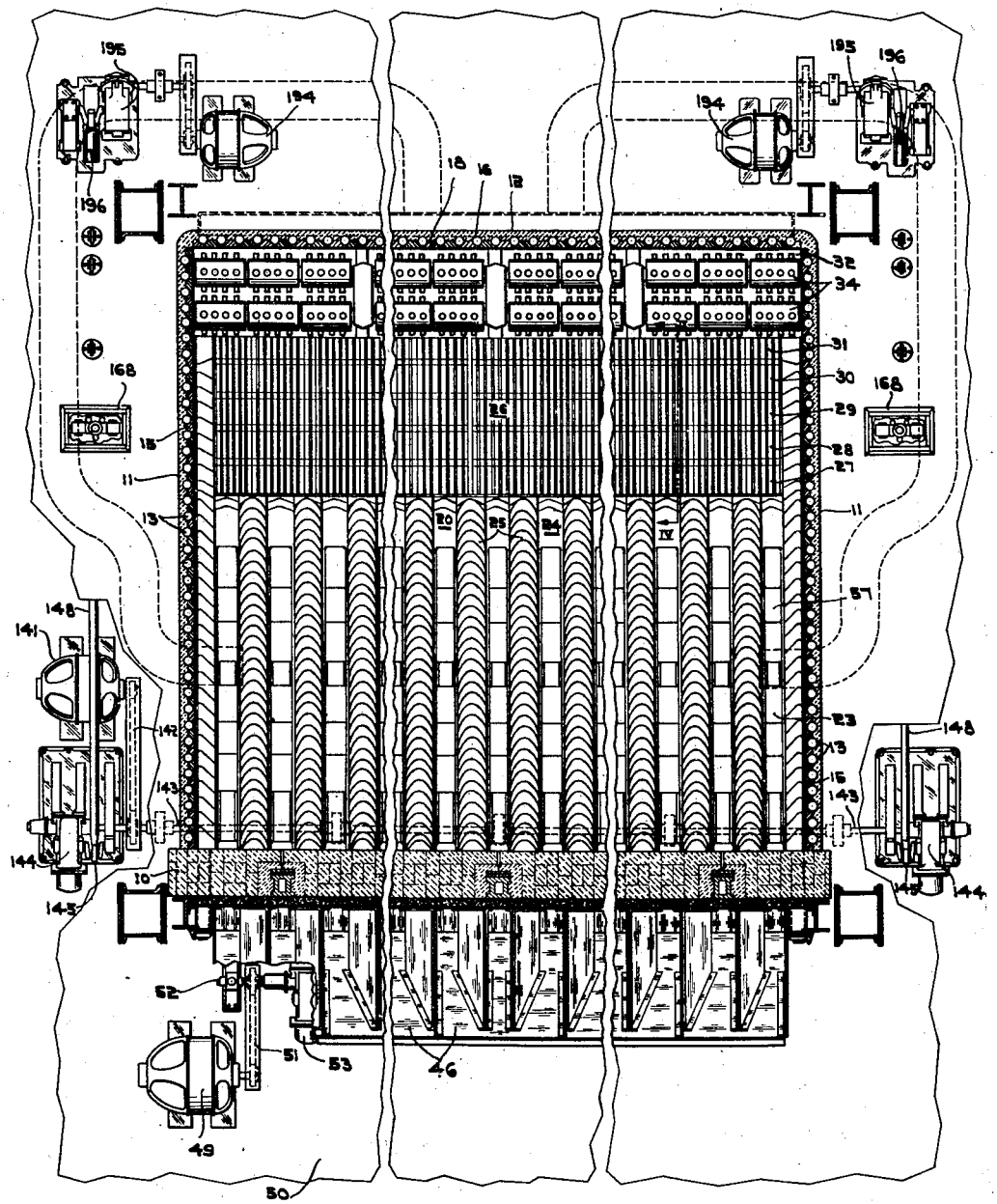
Fig. 2 is a horizontal, transverse, sectional view on the line II—II of Fig. 1, showing in plan my improved form of combustion apparatus.

Referring now more in detail to the construction illustrated in the accompanying drawings, it will be observed that I have shown in Figs. 1 and 2 a furnace having a front wall 10, side walls 11, 11 and a rear wall 12. The side walls 11, 11 and rear wall 12 are of the water cooled type. The side walls include vertical water tubes 13, 13, headers 14, 14 connecting the lower ends of the tubes and refractory blocks 15, 15 secured to the tubes (see also Fig. 3). The rear wall 12 is constructed in substantially the same manner as the side walls and includes vertical water tubes 16, 16, a header 17, and refractory blocks 18, 18 secured to the tubes.

A stoker structure 20 is disposed within the furnace and divides the furnace into a combustion chamber 21 and an air chamber 22. The stoker structure comprises an underfeed section 23 including alternately arranged retorts 24, 24 and tuyère rows 25, 25, and an overfeed section 26 comprising a plurality of series of grate members. Each series extends in the direction of fuel feed and comprises grate members 27, 28, 29, 30 and 31. The different series are disposed in side-by-side relation to form an unbroken fuel-supporting surface.

A clinker pit 32 is disposed at the discharge end of the overfeed grate section 26 and comprises a front wall 33, and clinker grinder rolls 34, 34. The rear wall for the clinker pit is provided by the lower end of the rear wall 12 of the furnace.

The upper end of the underfeed section 23 is supported by a transversely-extending beam member 35, which latter also forms the front wall of the air chamber 22. The lower end of the overfeed grate section is supported by the front wall 33 of the clinker pit, which also forms the rear wall of the air chamber 22. An I-beam 36 extends transversely through the air chamber and provides a supporting structure for both the lower end of the underfeed section and the upper end of the overfeed section.

The I-beam 36 forms a portion of a wall structure 37 which divides the air chamber 22 into a front air chamber 38 which supplies air to the underfeed section, and a rear air chamber 39 which supplies air to the overfeed section. Separate air supply conduits may be provided for the front and rear air chambers. However, I prefer to supply the air to the front chamber 38 by a conduit 40, and supply the air to the rear chamber 39 through a damper controlled opening 41 in the wall structure 37.

Ash hoppers 42 and 43 form the lower portions of the air chambers 38 and 39, respectively. Valve controlled openings 44 and 45 are provided in the lower portion of the hoppers 42 and 43, respectively. The purpose of these hoppers is to provide a means of collecting and disposing of any fine siftings which might fall from the stoker.

Coal is fed from hoppers 46, 46 and longitudinally into the ends of the retorts by primary rams 47, 47 reciprocating within ram boxes 48, 48. The primary rams are driven by any suitable means. I have shown an electric motor 49 supported by the operating floor 50 of the furnace room and connected by a chain drive 51 to a line shaft 52, which latter extends across the front of the stoker.

The line shaft extends through and is operatively connected to a plurality of selective speed reduction boxes 53, 53. The speed reduction gearing within the boxes drives crank shafts 54, 54 having crank portions 55, 55 thereon. Each crank portion 55 is connected to a primary ram 47 by a connecting rod 56. It is customary to provide one speed reduction box 53 and one crank shaft 54 for driving three primary rams.

The coal is fed longitudinally of the retorts by secondary rams 57, 57, each of which is connected by a suitable adjustable lost motion driving connection 58 with the connecting rod 56 which drives its respective main ram. The action of the secondary rams is such that the coal is also fed upwardly into the fuel bed and laterally on to the tuyère rows.

As stated above, the overfeed grate section 26 comprises a plurality of series of grate members 27, 28, 29, 30 and 31. As each series of grate members is of the same construction, I will describe only one of the series. For the purposes of description, the grate member 27 is referred to as the first grate member, the grate member 31 as the last grate member, and the grate members 28, 29 and 30 the intermediate grate members.

Figure 6:
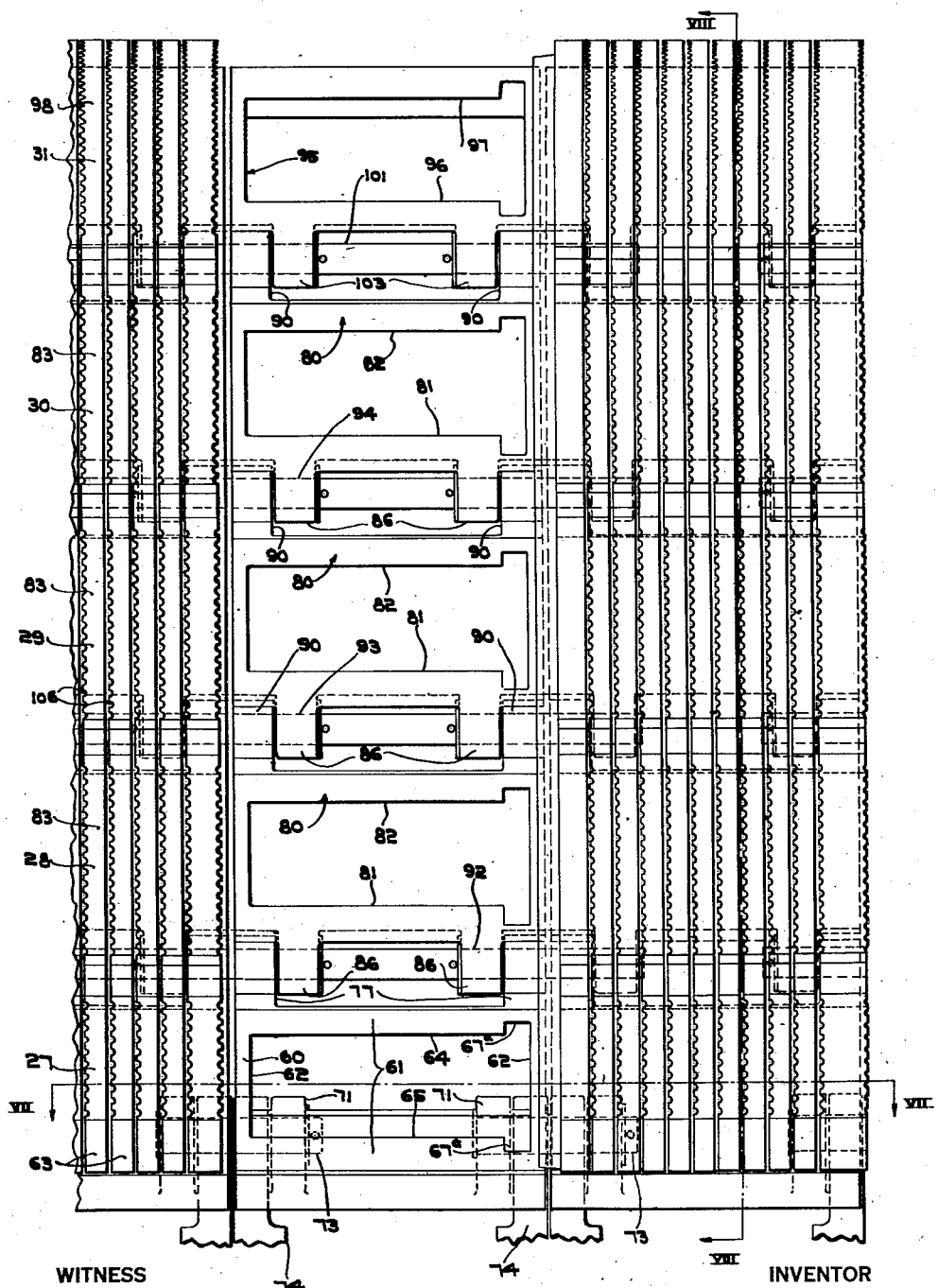
Fig. 6 is an enlarged fragmentary plan view showing a portion of the overfeed grate section, the grate bars being removed from one series of grate frames.

Referring now to Figs. 6, 7 and 8, it will be observed that the first grate member 27 comprises a rectangular frame 60 having integral end portions 61, 61 and side portions 62, 62, and a plurality of grate bars 63, 63 detachably secured within the frame 60.

The frame 60 is provided with a pair of opposed transversely-extending ribs 64 and 65 which are preferably formed integral with the end portions 61, 61. The grate bars 63, 63 are provided with undercut recesses 66 and 67 which cooperate with the ribs 64 and 65, respectively to hold the grate bars within the frame. The ribs 64 and 65 do not extend for the whole length of the end portions 61, 61 but stop short of one of the side portions 62 to provide openings 67a, 67a, through which the grate bars may be inserted.

The grate bars are assembled within the frame 60 by inserting the bars within the openings 67a, 67a, and then sliding the grate bars along the ribs 64 and 65. The last grate bar 63 is held in position within the openings 67a, 67a by means of a locking pin 68 inserted within an opening 69 provided in the web of the last grate bar. The locking pin is held in position within the grate bar by suitable cotter pins 70, 70.

A pair of spaced supporting lugs 71, 71 extend downwardly from the forward end of the grate frame 60. The lugs are provided with aligned openings through which extends a supporting rod 73 carried by brackets 74, 74, which latter are carried by stoker-supporting structure. This construction provides a pivotal support for the first grate member 60 adjacent its forward end. The rod 73 is shown as extending through the aligned openings of the lugs 71, 71 of adjacent first grate members 27. However, a separate rod may be provided for each of the first grate members, if desired.

The rear end of the first grate member 27 is provided with a pair of spaced downwardly-extending lugs 75, 75 having aligned openings. The rear end of the first grate member is also provided with a pair of rearwardly-extending lugs 77, 77 which are provided with aligned openings.

The intermediate grate members 28, 29 and 30 are of identically the same construction. Each of the intermediate grate members comprises a grate frame 80 having opposed parallel ribs 81 and 82, and grate bars 83, 83 having undercut recesses 84 and 85 fitting the ribs 81 and 82, respectively of the frame.

The forward ends of each of the intermediate grate members are provided with spaced lugs 86, 86 having aligned openings. The rear ends of each of the intermediate grate members are provided with spaced lugs 88, 88 extending downwardly therefrom and also having aligned openings. The intermediate grate members are also provided with rearwardly-extending lugs 90, 90 having aligned openings.

The first grate member 27 is pivotally connected to the intermediate grate member 28 by means of a rod 92 extending through the aligned opening in the lugs 77, 77 of the grate member 27 and the aligned openings in the lugs 86, 86 of the grate member 28.

The intermediate grate members 28 and 29 are pivotally connected together by means of rods 93, 93 extending through the aligned openings in the lugs 90, 90 of the grate member 28 and through the aligned openings in the lugs 86, 86 of the grate member 29. Likewise the grate member 29 is pivotally connected to the grate member 30 by a rod 94 which extends through the aligned openings of the grate member 29 and the aligned openings of the grate member 30.

The rear grate member 31 comprises a rectangular frame 95 having opposed parallel ribs 96 and 97 and grate bars 98, 98 having undercut recesses 99 and 100 cooperating with the parallel ribs 96 and 97, respectively. The forward end of the grate member 31 is pivotally connected to the rear end of the grate member 30 by means of a rod 101 extending through aligned openings provided in forwardly-extending lugs 103, 103 on the rear grate member, and through the aligned openings provided in the rearwardly-extending lugs 90, 90 of the intermediate grate member 30.

The rods 92, 93 and 94 may provide the pivotal connection between the grate members of each series or if desired they may be of sufficient length to provide the pivotal connections between the corresponding grate members of any number of series.

The rear end of the rear grate member 31 is supported for slidable movement by improved combined air and water supply castings 105, 105 carried by the upper portion of the front wall 33 of the clinker pit.

The grate bars 63, 83, 83 and 98 are each provided with vertical grooves 106, 106 which are disposed in spaced relation to one another throughout the length of each bar. The purpose of the grooves is to permit the air for supporting combustion to pass from the air chamber 39 and into the burning fuel on the overfeed grate section. This arrangement provides for the uniform and thorough distribution of air through the entire overfeed grate. The webs of all of the grate bars are provided with spacing projections 107, 107 for maintaining the bars in their proper relative positions.

The details of construction of the several grate members comprising the overfeed grate are not claimed in this application, such details being claimed in my copending divisional application, Serial No. 442,358, filed April 7, 1930, and assigned to the Westinghouse Electric and Manufacturing Company.

I provide improved means for supporting and moving the grate members forming the overfeed grate section, adjacent their intermediate pivotal connections (see Figs. 3, 4, 5 and 8). As shown, a plurality of structural beams 110, 110 are disposed within the air chamber 39 and are supported at their forward ends by the I-beam 36, and are supported at their rear ends by an I-beam 111.

A supporting bearing 112 is secured to each of the beams 110, and a power shaft 113 is mounted within the bearings 112. A plurality of rocker levers 114, 114 are keyed to the power shaft 113. A driving link 115 is pivotally connected by a pin 116 to the forward end of each of the rocking levers 114, and a driving link 117 is pivotally connected by a pin 118 to the rear end of each of these levers.

The upper ends of the driving links 115, 115 are pivotally connected to the downwardly-extending lugs 75, 75 carried by the first grate member 27, by means of a suitable rod 119 passing through the aligned openings in the lugs 75, 75 and through suitable openings provided in the upper end of each of the power links 115, 115.

The upper ends of the rear driving links 117, 117 are pivotally connected to the downwardly-extending lugs 88, 88 of each of the intermediate grate members 29, by a rod 121 extending through the aligned openings provided in the downwardly-extending lugs 88, 88 and through openings provided in the upper end of the driving links 117, 117.

The downwardly-extending lugs 88, 88 provided on the intermediate grate member 28 are pivotally connected to the upper ends of supporting links 125, 125, by a rod 126 extending through the aligned openings provided in the lugs 88, 88 and through openings provided in the supporting links 125, 125. The lower ends of the supporting links 125, 125 are pivotally connected to a supporting shaft 128 extending transversely of the air chamber 39, which shaft is supported by brackets 129, 129 carried by the upper portion of the housing for the bearings 112, 112.

The rear ends of the intermediate grate members 30, 30 for all of the series are pivotally connected to the upper ends of supporting links 130, 130, by a rod 131 extending through the aligned openings provided in the downwardly-extending lugs 88, 88 of the grate members 30, 30 and through openings provided in the upper ends of the supporting links 130, 130. The lower ends of the supporting links 130, 130 are pivotally connected to a supporting shaft 133, which shaft extends transversely of the air chamber 39, and is in turn supported by suitable supporting brackets 134, 134 carried by the structural beams 110, 110.

The power shaft 113 is oscillated by adjustable lost motion driving mechanisms 140, 140 disposed exteriorly of the furnace. In cases where the grate surface of the stoker is unusually wide, it is preferred to divide the overfeed grate into two sections, and operate the sections by separate driving mechanisms. Such a stoker is shown in the accompanying drawings.

Figure 3:
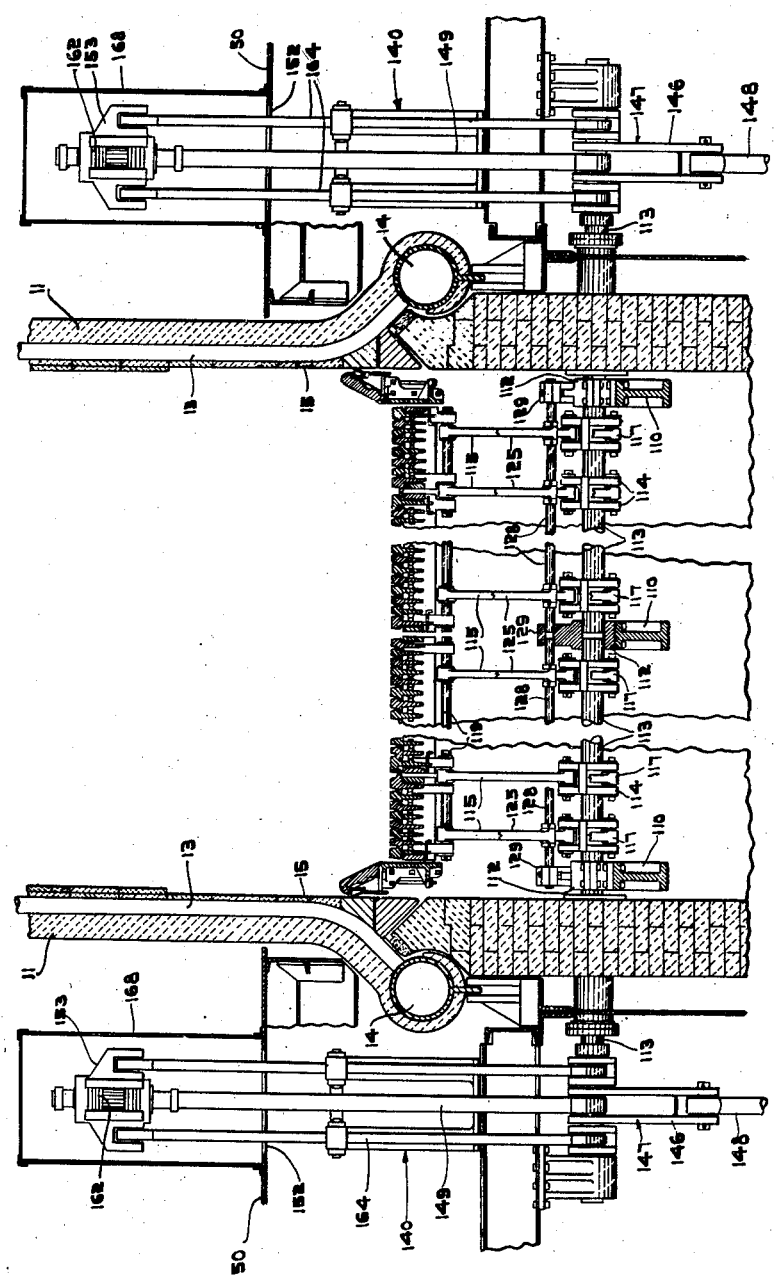
Fig. 3 is a vertical, transverse, sectional view taken on the line III—III of Fig. 1 and showing the driving mechanism for my improved form of overfeed grate.

In Fig. 3, I have shown the power shaft 113 as divided in the center of the stoker. The overfeed grate is also shown as divided. Obviously, the two halves of the overfeed grate may be operated at different speeds, and in such a manner that while one half is moving in one direction, the corresponding parts of the other half will be moving in the other direction.

Preferably, however, I desire that the two halves be operated synchronously. This is effected by connecting the speed reduction boxes which operate the driving mechanisms 140. In Fig. 2 I have shown a motor 141 disposed at one side of the furnace and connected by means of a chain drive 142 to a shaft 143 extending transversely underneath the front air chamber 38. The shaft 143 is connected at each end to a speed reduction box 144.

Referring now to Figs. 1, 3 and 9 to 13, inclusive, for a more detailed description of the lost motion driving mechanisms 140, 140, it will be observed that power is transmitted from cranks 145, 145 of the speed reduction boxes 144, 144 to arms 146, 146 of bell cranks 147, 147, by means of connecting rods 148, 148. The bell cranks 147, 147 are mounted loosely on the outer ends of the power shaft 113. As the lost motion driving mechanisms 140, 140 are identical in construction, a description of one will be sufficient for both.

A rod 149 is pivotally connected at its lower end by a pin 150 to the outer end of a second arm 151 of the bell crank 147. The rod 149 extends upwardly through an opening 152 in the operating floor 50 of the furnace room.

A yoke 153 is loosely mounted upon the upper end of the rod 149. The yoke 153 is in the form of an integral casting having upper and lower abutments 154 and 155, and laterally-extending arms 156 and 157. The abutments 154 and 155 have aligned openings 158 and 159, respectively, which loosely receive the rod 149.

A collar 160 is secured by means of a shearing pin 161, to the upper end of the rod 149. The collar is mounted on the rod 149 between the abutments 154 and 155. A plurality of filler blocks 162, 162 are disposed between the collar 160 and each of the abutments 154 and 155, and are held in position by detachable plates 163, 163 secured to the yoke 153. The filler blocks serve to transmit the motion from the rod 149 to the abutments 154 and 155 of the yoke.

Rods 164, 164 are connected at their upper ends by pins 165, 165 to the outer ends of the arms 156 and 157 of the yoke. The lower ends of the rods 164, 164 are pivotally connected by pins 166, 166 to the outer ends of lever arms 167, 167. The inner ends of the lever arms 167, 167 are keyed to the power shaft 113 (see Fig. 13).

It will thus be seen that motion imparted to the bell crank 147 by the connecting rod 148, will be transmitted through the rod 149, collar 160, filler blocks 162, 162, abutments 154 and 155, arms 156 and 157, rods 164, 164 and lever arms 167, 167 to the power shaft 113. Varying degrees of lost motion may be had by removing or inserting any desired number of the filler blocks 162, 162.

Should, for any reason, the grate members or the operating mechanism therefor become jammed, the shearing pin 161 will fail and permit free movement of the rod 149. This arrangement will thereby prevent any damage to the parts.

The upper ends of the rods 164, 164 and 149, and the yoke 153 are disposed above the operating floor 50, thus affording easy access to the parts for the purpose of adjustment. A housing 168 encloses the upper ends of the rods and yoke, and is provided with doors 169, 169, through which the parts may be easily reached.

Figure 4:
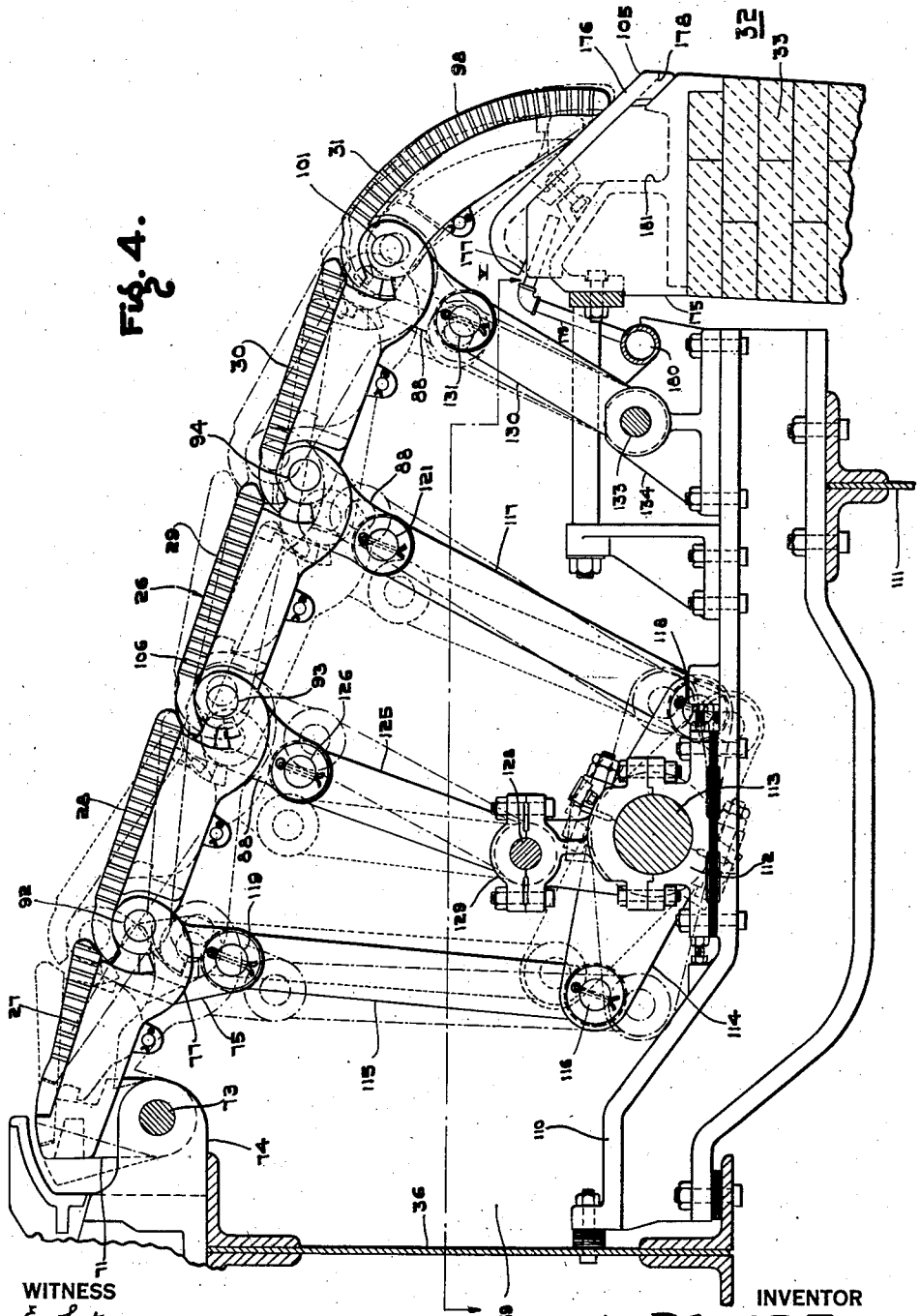
Fig. 4 is an enlarged, fragmentary, longitudinal, sectional view taken on the line IV—IV of Fig. 2, and showing my improved form of overfeed grate section.
Figure 5:
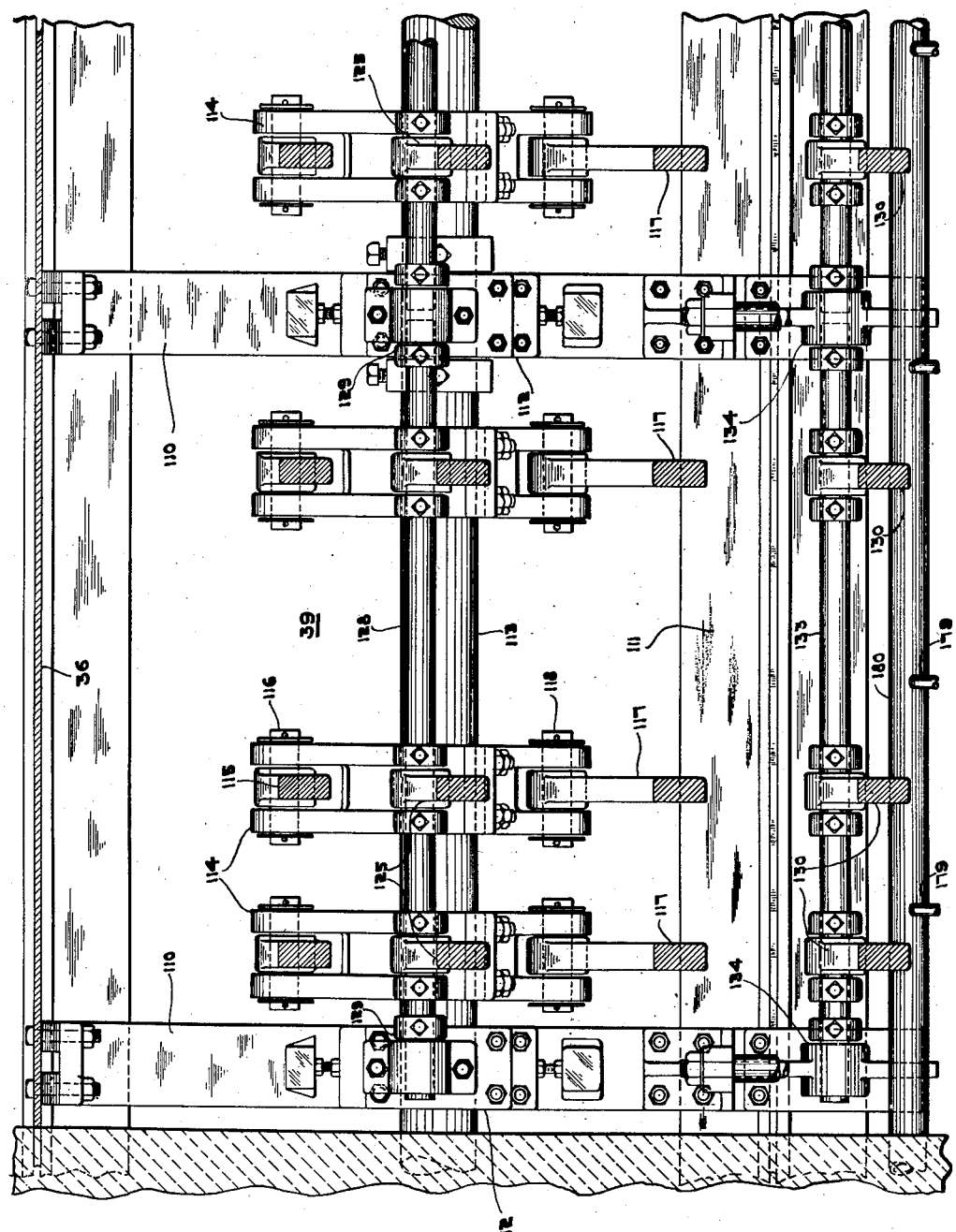
Fig. 5 is an enlarged fragmentary horizontal sectional view taken on the line V—V of Fig. 4 and showing in plan the interior driving mechanism for the overfeed grate.

Referring now to Fig. 4 of the drawings, it will be readily seen that an oscillatory movement of the power shaft 113 results in an oscillatory movement of the rocking levers 114, 114, thereby imparting an up and down movement to the pivot rods 119 and 121 and also the pivotal connections between the grate members 27 and 28, and 29 and 30. As the pivotal connections between the grate members 28 and 29, and 30 and 31 are supported by the links 125 and 130, and as the rear end of the grate member 31 is free to slide upon its support, this up and down movement of the driving links will result in the grate members 28, 29, 30 and 31 being also moved bodily in the direction of fuel feed.

The mid position of the several grate members forming a series is shown in full lines in Fig. 4. I have indicated in fine dotted lines the position which the several parts will occupy when the rocking levers 114, 114 are in one extreme position; and I have indicated in dot and dash lines the positions which the several parts will occupy when the rocking levers are in the other extreme position.

From a careful examination of the several positions of the grate members and the operating and supporting means, it will be observed that the grate members 28, 29, 30 and 31 of each series move both angularly about axes extending transversely of the fuel feed and also move bodily in the direction of the fuel feed. These grate members might be said to have combined motions, one motion being in the direction of the fuel feed and another motion being at an angle to the fuel-supporting surface.

It will also be noted that the first grate member 27 is supported for angular movement about its forward end. As the angular movement shown is movement about a fixed axis provided by the rod 73, there will also be a certain amount of movement in the direction of the fuel feed, the latter movement being that component of the arc of movement of the grate member 27, which extends in the direction of the fuel feed. It may, therefore, be stated, that the first grate member 27 also has combined motions which are similar to those of the other grate members.

By reason of the peculiar construction of the grate members forming the overfeed grate section and the peculiar movement imparted thereto; the burning fuel received from the underfeed section is more effectively broken up than has been possible heretofore, a uniform supply of air for supporting combustion passes through the fuel bed and burns out the combustible contained therein, and lastly the fuel bed is moved positively, progressively and in a uniform manner toward the clinker pit, thereby relieving the congested condition of the underfeed section and preventing the formation of large clinkers, and lastly aiding materially in the elimination of "pop corn". The angular movement of the grate members breaks up the fuel bed, and the movement in the direction of the fuel feed positively moves the fuel bed.

As the grate members forming each series are pivotally connected together in end-to-end relation, and as the several series are arranged in abutting side-by-side relation, it will be seen that I have provided an unbroken fuel-supporting surface, through which very little loss of combustible, due to sifting, may be had.

As the overfeed grate section maintains the fuel bed in a thoroughly broken up condition, and as the grooves 106, 106 are distributed uniformly over the entire surface and in close proximity to one another; an ample supply of air for supporting combustion passes freely through the fuel bed. Also, as the overfeed grate provides for the constant and uniform movement of the fuel bed, the underfeed section is kept comparatively free of ash, and, as a result, the air for supporting combustion passes freely through the tuyère rows and fuel bed supported thereby. Therefore, the stoker may be operated at extremely high capacities with very little air pressure in the chambers 38 and 39.

According to present-day practice, clinker pits are provided with cast iron front walls. These walls are usually in the form of movable aprons composed of several sections disposed in abutting side-by-side relation. In addition to providing a front wall for the pit, the purpose of these aprons is to provide a means for permitting the removal of any clinkers in the pit which are of such a size that they cannot be ground out by the rolls.

By reason of the fact that heretofore the front walls were formed in the manner above described, maintenance costs on clinker pits have been extremely high. If the pressure of the gases burning within the pit be greater than that of the atmosphere, these gases will pass through the joints formed by adjacent sections of the cast iron front wall and thereby result in the burning out of the front wall at that point. The above described condition is not unusual in the operation of a clinker pit for the reason that the material within the pit is of varying density and, as a result, high pressure areas will develop at different points in the pit and cause this flow of gases out through the joints as explained.

By reason of the fact that I provide an overfeed grate section, which burns out the major portion of the combustible in the material, and delivers this material to the pit in a uniform stream, it is practically impossible for clinkers to form in the pit in a size which cannot be effectively broken up and ground out by the rolls.

In Figs. 1 and 14 of the drawings I have shown the front wall 33 of the clinker pit as being formed of brick. The structure is unitary and immovable, thus preventing the burning gases from escaping. The life of the brick front wall is much longer than that of the cast iron aprons heretofore used, and, therefore, its maintenance cost is extremely low. The interior surface of the wall 33 is smooth and uninterrupted, and thereby offers no obstruction to the downward movement of the refuse within the pit.

Figure 18:
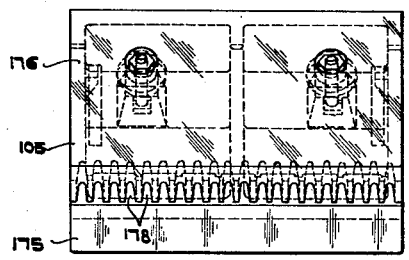
Fig. 18 is an enlarged detail elevational view showing the combined air and water supply box which is supported by the upper portion of the front wall of the clinker pit.
Figure 19:
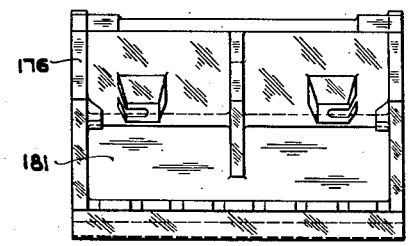
Fig. 19 is a plan view showing the interior of the cover portion of the combined air and water box shown in Fig. 8; and, Fig. 20 is a plan view showing the body portion of the box shown in Fig. 18.
Figure 20:
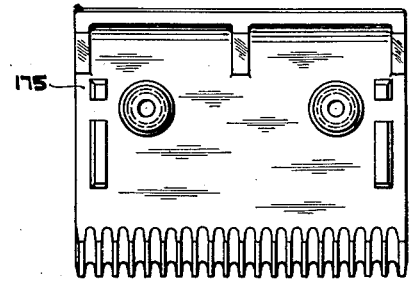

As was stated previously, I provide a series of box-like castings 105, 105 which are supported by the upper end of the wall 33 and serve to supply both air and water to the interior of the pit. One of these castings is shown in detail in Figs. 18, 19 and 20 of the drawings.

Each of the castings comprises a body member 175 and a cover member 176. The body and cover are so formed that when assembled upon the front wall of the clinker pit, openings 177, 177 are provided, through which the air and water may flow into the hollow interior of the casting, and openings 178, 178 are provided for permitting the flow of the air and water to the interior of the pit (see also Figs. 4 and 8).

The air under pressure is supplied to the interior of the castings from the air chamber 39. The water is supplied to the interior of the castings by means of suitable pipes 179, 179 which are connected to a water supply conduit 180. One supply pipe is provided for each of the castings (see Fig. 5).

The body member of each of the castings is provided with a basin 181 for receiving and collecting the water supplied by the pipes 179, 179. The water overflows from the basin 181 and through the several openings 178, 178 and on to the interior face of the front wall 33. The openings 178, 178 are disposed close one to another, and as a result, the entire front wall of the pit will be covered by a sheet of water, which water will maintain the surface of the wall in a cool condition and thereby prevent the adherence of clinkers thereto.

The air passes freely through the upper portion of the openings 178, 178 and into the interior of the pit for supporting the combustion of combustible material remaining in the refuse.

I also provide a series of box-like castings 185, 185 which are embedded within the front wall of the pit midway between the top thereof and the grinding rolls. The purpose of the castings is to provide an additional means for supplying a controlled amount of air to the pit for supporting combustion.

Figure 15:
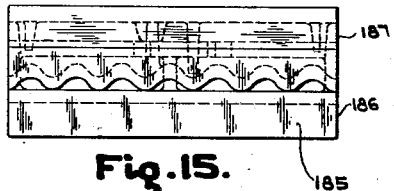
Fig. 15 is an enlarged detail elevational view showing one of the air boxes which supply the air through the front wall of the clinker pit.
Figure 16:
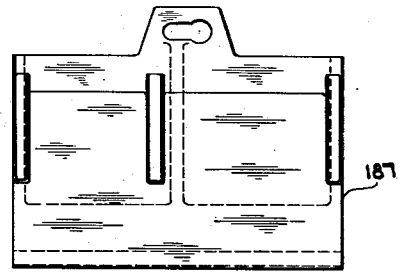
Fig. 16 is a plan view showing the interior of the cover portion of the box shown in Fig. 15.
Figure 17:
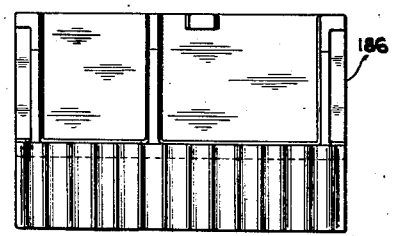
Fig. 17 is a plan view showing the interior of the body portion of the box shown in Fig. 15.

These castings 185, 185 are arranged in abutting side-by-side relation and extend across the front wall of the pit. One of the castings 185 is shown in detail in Figs. 15, 16 and 17. The casting comprises a body portion 186 and a cover portion 187. The body and cover are so formed as to provide a passage 188 therethrough which permits the air under pressure within the chamber 39 to pass into the clinker pit 32 for supporting combustion (see Fig. 1).

The shafts of the grinder rolls 34, 34 extend through openings 190, 190 provided in the end walls of the pit and are supported by bearings 191, 191 disposed within these openings (see Fig. 14). Intermediate bearings 192, 192 are provided within the pit for also supporting the grinder rolls.

As stated, I have shown in the accompanying drawings an unusually large stoker. In order to provide a more efficient operation, the grinder rolls are divided.

The rolls 34, 34 extend outwardly of the furnace and are operated by suitable pawl and ratchet mechanisms 193, 193, which latter are driven by motors 194, 194 supported upon the operating floor 50 (see Figs. 1 and 2). Power is transmitted from each motor to its pawl and ratchet mechanism 193 by means of a suitable speed reduction box 195 and connecting rod 196.

At each side of the furnace, I provide a laterally-extending box-like supporting structure 200 (see Fig. 14). Bearings 201, 201 are mounted within each of the supporting structures 200, and provide means for supporting the outer ends of the grinder rolls 34, 34. In order that the grinder rolls be protected from the heat of the burning refuse, I have shown them as being immersed in water, the level of which is indicated at 202. As the water will flow through the bearings 191, 191, and as it is desired that the interior of the furnace be sealed against the admission and escape of air, the upper edge of the supporting structures 200, 200 are at a sufficient height to maintain a liquid seal for preventing such undesired admission or escape of air through the bearings 191, 191.

The refuse is ground from the clinker pit and into an ash pit 203 (see also Fig. 1). A sluice way 204 extends parallel to the ash pit 203 and serves to conduct away the refuse from the ash pit.

The details of construction of the clinker pit, including the box-like castings 105 and 185, are not claimed in this application. These features are claimed in my copending application, Serial No. 498,929, filed November 29, 1930, and assigned to the Westinghouse Electric & Manufacturing Company; such copending application being a division of the present application.

In installations heretofore known to me, the clinker pits have been constructed very deep, the purpose of which was to permit the combustible to burn out and the refuse to cool before contacting with the grinder rolls. Such pits must be arranged within the overall vertical confines of the building housing the plant, and the deeper the pit, the more is the expense of the building, particularly the basement thereof.

As the improved overfeed grate section burns out an extremely large percentage of the combustible before it reaches the clinker pit, and as the grinder rolls are immersed in water, the construction disclosed makes possible a much shallower clinker pit thereby resulting in a material saving in the basement room space vertically, and therefore in the vertical over-all height of the building.

From the foregoing, it will be apparent that I have devised a stoker capable of being embodied in large sizes. The stoker includes an underfeed section and an overfeed section including elements which have movement of an undulatory character to thoroughly agitate the material coming from the underfeed section, while, at the same time, maintaining continuously an unbroken fuel-supporting surface. The movement of the elements of the overfeed section up and down results in the breaking up of the lanes of material coming from the underfeed section and the thorough mixing of the material, so as to promote more uniform combustion. Of course, such up and down movement serves also to break up and distribute the ash and clinker-forming material, thereby reducing the likelihood of large clinker agglomerates.

In addition to the up and down motion, the elements have a to and fro motion modified by the undulatory motion so that material is positively fed along the overfeed section to the ash pit. The movement of the overfeed section may be adjusted with respect to the underfeed section to obtain a desired progression of material throughout the stoker.

Due to motion imparted to the fuel throughout the stoker, more thorough and even combustion is secured, the formation of thin spots or blow-holes is almost altogether avoided, and the formation of large clinker masses is greatly minimized. Special means are provided for supplying air to the sections in such amounts and at such pressures as to promote combustion of the material moved and agitated in the manner set forth. Due to the fact that the movement of the fuel bed is brought more under the control of the operator and to the fact that the overfeed section does not operate in an uneven or erratic manner, a more uniform combustion is secured throughout the stoker. The combustion of the material is relatively much more complete when the latter is delivered to the ash pit, so that less combustion takes place in the latter and the latter is less highly heated, thereby permitting of the front wall thereof being largely constructed of brick work.

While I have shown my invention in but one form, it will be obvious to those skilled in the art that it is not so limited, but is susceptible of various changes and modifications without departing from the spirit thereof, and I desire, therefore, that only such limitations shall be placed thereupon as are imposed by the prior art or as are specifically set forth in the appended claims.

What I claim is:

1. In a stoker whereon the fuel bed moves in a single general direction from the front to the rear, the combination of an underfeed section comprising alternately-disposed retorts and tuyère rows which discharge a fuel bed in a more advanced state of combustion from the rear ends of the tuyère rows and a less advanced state of combustion from the rear ends of the retorts; a movable overfeed section having its forward end continuously disposed to receive the fuel bed discharging from the underfeed section and both sections presenting under all conditions of operation an unbroken fuel-supporting surface; said overfeed section comprising a series of grate members connected in end-to-end relation so as to provide relative angular movement and extending in the general direction of fuel feed; and means providing for movement of some of said grate members both angularly with respect to the fuel-supporting surface and bodily in the general direction of the fuel feed, whereby the burning material received from the underfeed section is fed positively along the overfeed section and agitated during its progress to facilitate combustion.

2. In a stoker whereon the fuel bed moves in a single general direction from the front to the rear, the combination of an underfeed section comprising alternately-disposed retorts and tuyère rows which discharge a fuel bed in a more advanced state of combustion from the rear ends of the tuyère rows and a less advanced state of combustion from the rear ends of the retorts; a movable overfeed section having its forward end continuously disposed to receive the fuel bed discharging from the underfeed section and both sections presenting under all conditions of operation an unbroken fuel-supporting surface; said overfeed section comprising a series of grate members connected in end-to-end relation so as to provide relative angular movement and extending in the general direction of fuel feed; and means providing for movement of some of said grate members both angularly with respect to the fuel-supporting surface and bodily in the general direction of fuel feed, whereby the burning material received from the underfeed section is fed positively along the overfeed section and agitated during its progress to facilitate combustion, the overfeed grate section being provided with a plurality of air-emitting openings distributed over the entire surface thereof in order to supply air in a distributed manner to the fuel bed.

3. In a stoker whereon the fuel bed moves in a single general direction from the front to the rear, the combination of an underfeed section comprising alternately-disposed retorts and tuyère rows which discharge a fuel bed in a more advanced state of combustion from the rear ends of the tuyère rows and a less advanced state of combustion from the rear ends of the retorts; a movable overfeed section having its forward end continuously disposed to receive the fuel bed discharging from the underfeed section and both sections presenting under all conditions of operation an unbroken fuel-supporting surface; said overfeed section comprising a series of grate members connected in end-to-end relation so as to provide relative angular movement and extending in the general direction of fuel feed; means providing for movement of some of said grate members both angularly with respect to the fuel-supporting surface and bodily in the general direction of fuel feed, whereby the burning material received from the underfeed section is fed positively along the overfeed section and agitated during its progress to facilitate combustion; and means providing for variation in the movement of the grate members.

4. In a stoker whereon the fuel bed moves in a single general direction from the front to the rear, the combination of an underfeed section comprising downwardly-inclined and alternately-disposed retorts and tuyère rows which discharge a fuel bed in a more advanced state of combustion from the rear ends of the tuyère rows and a less advanced state of combustion from the rear ends of the retorts; a movable and downwardly-inclined overfeed grate section having its forward end disposed to receive the fuel bed discharging from the underfeed section and both sections presenting under all conditions of operation an unbroken fuel-supporting surface; said overfeed section comprising a series of grate members connected in end-to-end relation so as to provide relative angular movement and extending in the general direction of fuel feed; and means for supporting and moving the overfeed section including means for anchoring one grate member, means for supporting the remaining grate members for bodily movement in the direction of fuel feed, and means for imparting angular movement to some of the grate members including the anchored grate member, whereby the grate members other than the anchored one move bodily in the direction of fuel feed due to expansion and contraction in length of the overfeed section incident to said angular movement.

5. In a stoker whereon the fuel bed moves in a single general direction from the front to the rear, the combination of an underfeed section comprising downwardly-inclined alternately-arranged retorts and tuyère rows which discharge a fuel bed in a more advanced state of combustion from the rear ends of the tuyère rows and a less advanced state of combustion from the rear end of the retorts; a movable and inclined overfeed section disposed to receive the fuel bed discharging from the underfeed section and both sections presenting under all conditions of operation an unbroken fuel-supporting surface; said overfeed section comprising a series of grate members pivotally connected together in end-to-end relation and extending in the direction of fuel feed with their pivotal connections arranged horizontally and disposed transversely of the direction of fuel feed; means for supporting the first grate member of the series for movement in a predetermined path; means for supporting the remaining grate members of the series for movement bodily in the direction of fuel feed; and means for moving the entire overfeed section; the overfeed section, its supporting means and its moving means being so constructed and arranged that the fuel-supporting portions of the grate members have combined motions, one motion being in the direction of fuel feed and the other motion being angular with respect to the fuel-supporting surface.

6. In a stoker whereon the fuel bed moves in a single general direction from the front to the rear, the combination of an underfeed section comprising downwardly-inclined and alternately-disposed retorts and tuyère rows which discharge a fuel bed in a more advanced state of combustion from the rear ends of the tuyère rows and a less advanced state of combustion from the rear ends of the retorts; a movable overfeed grate section continuously disposed to receive the fuel bed discharging from the underfeed section and being provided with a plurality of air-emitting openings distributed over the entire surface thereof in order to supply air in a distributed manner to the fuel bed; said overfeed section comprising a plurality of grate members connected together in end-to-end relation so as to provide relative angular movement and extending in the direction of fuel feed; means for oscillating at least some of the grate members about horizontal axes extending transversely of the direction of fuel feed and for securing movement of such grate members bodily in the direction of fuel feed; the oscillatory movements being such that a plurality of the grate members move in one direction while other grate members move in the other direction and such that adjacent oscillated grate members have oscillatory motion in opposite directions thereby resulting in agitation of the fuel bed to facilitate the entrance of air for combustion and in positive progression of the bed over the overfeed section; and means providing for variation in oscillatory movement of the oscillatory grate members.

7. In a stoker whereon the fuel bed moves in a single general direction from the front to the rear, the combination of an underfeed section comprising downwardly-inclined and alternately-disposed retorts and tuyère rows which discharge a fuel bed in a more advanced state of combustion from the rear ends of the tuyère rows and a less advanced state of combustion from the rear ends of the retorts; a movable and downwardly-inclined overfeed section having its forward end disposed to receive the fuel bed discharging from the underfeed section and both sections presenting under all conditions of operation an unbroken fuel-supporting surface; said overfeed section comprising a series of grate members pivotally connected together in end-to-end relation and extending in the direction of the fuel feed; apparatus for supporting the grate members in position including a fixed pivot for the forward end of the forward grate member of the series and supporting means providing for bodily movement of the remaining grate members; said supporting means including driving members associated with at least two of the series pivotal connections, each of the driving members being movable alternately in opposite directions; and means for moving successive driving members simultaneously in opposite directions.

8. In a stoker including a stationary and movable structure and whereon the fuel bed moves in a single general direction from the front to the rear, the combination of an underfeed section comprisng downwardly-inclined and alternately-disposed retorts and tuyère rows which discharge a fuel bed in a more advanced state of combustion from the rear ends of the tuyère rows and a less advanced state of combustion from the rear ends of the retorts; a movable overfeed section for agitating and positively feeding the bed comprising a plurality of grate members; and apparatus for moving and supporting the grate members including pivotal connections for connecting the first grate member to stationary stoker structure at the discharge end of the underfeed section and for connecting the grate members in series and including means for supporting the remaining grate members for movement bodily in the direction of fuel feed; said means including mechanism for moving all of the series pivotal connections so that each series pivotal connection has components of motion normal to and in the direction of fuel feed and including means for imparting opposite movements to the first and another of the series pivotal connections.

9. In a stoker including a stationary and movable structure and whereon the fuel bed moves in a single general direction from the front to the rear, the combination of an underfeed section comprising downwardly-inclined alternately-arranged retorts and tuyère rows constructed and arranged to discharge a fuel bed in a more advanced state of combustion from the rear ends of the tuyère rows and a less advanced state of combustion from the rear end of the retorts; an overfeed section constructed and arranged to receive the fuel bed discharging from the underfeed section and providing, with the underfeed section, under all conditions of operation an unbroken fuel-supporting surface; said overfeed section comprising a series of grate members pivotally connected together in end-to-end relation and extending in the direction of fuel feed with their pivotal connections arranged horizontally and disposed transversely of the direction of fuel feed; means provided on said stationary structure for supporting the first grate member of the series for angular movement about its forward end; means for supporting the remaining grate members for angular movement about horizontal axes extending transversely of the direction of fuel feed and also for movement bodily in the direction of fuel feed; and means for effecting said movements of the grate members.

10. In a stoker including a stationary and movable structure and whereon the fuel bed moves in a single general direction from the front to the rear, the combination of an underfeed section comprising downwardly-inclined alternately-arranged retorts and tuyère rows which discharge a fuel fed in a more advanced state of combustion from the rear ends of the tuyère rows and a less advanced state of combustion from the rear ends of the retorts; a movable overfeed section continuously disposed to receive the fuel bed discharging from the underfeed section and both sections presenting under all conditions of operation an unbroken fuel-supporting surface; said overfeed section comprising a series of grate members pivotally connected together in end-to-end relation and extending in the direction of fuel feed with their pivotal connections arranged horizontally and disposed transversely of the direction of fuel feed; means provided on said stationary structure for supporting the first grate member of the series for angular movement with respect to the fuel-supporting surface; means for supporting the remaining grate members of the series for movement bodily in the direction of fuel feed; and means for imparting such angular movement to the first grate member of the series.

11. In a stoker whereon the fuel bed moves in a single general direction from the front to the rear, the combination of an underfeed section comprising alternately-disposed retorts and tuyère rows constructed and arranged to discharge a fuel bed in a more advanced state of combustion from the rear ends of the tuyère rows and a less advanced state of combustion from the rear ends of the retorts; an overfeed section having its forward end constructed and arranged to receive the fuel bed discharging from the underfeed section and both sections presenting under all conditions of operation an unbroken fuel-supporting surface; said overfeed section comprising a series of grate members pivotally connected together in end-to-end relation and extending in a direction of fuel feed with their pivotal connections disposed transversely of the direction of fuel feed; and mechanism for supporting and moving the overfeed section comprising means for anchoring one of said grate members, means for supporting the remaining grate members for movement bodily in the direction of fuel feed, and means for moving some of said remaining grate members about their pivotal connections whereby the latter grate members move both bodily in the direction of fuel feed and at the same time angularly with respect to the fuel-supporting surface.

12. In a stoker having stationary and movable structure and whereon the fuel bed moves in a single general direction from the front to the rear, the combination of an underfeed section comprising downwardly-inclined and alternately-disposed retorts and tuyère rows constructed and arranged to discharge a fuel bed in a more advanced state of combustion from the rear ends of the tuyère rows and a less advanced state of combustion from the rear ends of the retorts; an overfeed section having a pivotal anchorage connection with respect to the stoker structure and having its forward end constructed and arranged to receive the fuel bed discharging from the underfeed section; both the underfeed and overfeed sections presenting under all conditions of operation an unbroken fuel-supporting surface; said overfeed section comprising a series of grate members pivotally connected together in end-to-end relation and extending in the direction of fuel feed; all of said grate members except the last having, in one position, the fuel-supporting surfaces thereof arranged substantially in a single plane inclined in substantially the same direction as that of the inclination of the underfeed section and the last grate member having an upper surface at least a portion of which is inclined at a relatively much steeper angle of inclination; means for imparting angular movements in opposite directions to a plurality of said grate members so that the fuel-supporting portions thereof move away from the plane of said position; and means providing for extension and contraction movements of the overfeed section in the direction of fuel feed incident to angular movements of the grate members and providing for angular movement of the last grate member about its pivotal connection incident to the extension and contraction movements of the overfeed section both to agitate and to exert a pushing effect on the discharging refuse.

13. In a stoker having stationary and movable structure and whereon the fuel bed moves in a single direction from the front to the rear, the combination of an underfeed section comprising downwardly-inclined and alternately-disposed retorts and tuyère rows which discharge a fuel bed in a more advanced state of combustion from the rear ends of the tuyère rows and a less advanced state of combustion from the rear ends of the retorts; a movable overfeed section having a pivotal anchorage connection with respect to the stoker structure and having its forward end continuously disposed to receive the fuel bed discharging from the underfeed section; both the underfeed and overfeed sections presenting under all conditions of operation an unbroken fuel-supporting surface; said overfeed section comprising a series of grate members connected in end-to-end relation and extending in the direction of fuel feed; means for imparting angular movements in opposite directions to a plurality of the grate members and including an operating member movable alternately in opposite directions; means providing for extension and contraction movements of the overfeed section in the direction of fuel feed incident to angular movements of said plurality of grate members; a source of power; means for transmitting and transforming motion derived from said source to operate said operating member; and means for adjusting the motion-transmitting and transforming means so as to vary the amplitude of movement of said operating member.

14. In a stoker whereon the fuel bed moves in a single general direction from the front to the rear, the combination of an underfeed section comprising alternately-disposed retorts and tuyère rows constructed and arranged to discharge the fuel bed in a more advanced state of combustion from the rear ends of the tuyère rows and a less advanced state of combustion from the rear ends of the retorts; an overfeed section having its forward end constructed and arranged to receive the fuel bed discharging from the underfeed section and both sections comprising under all conditions of operation an unbroken fuel-supporting surface; said overfeed section comprising a series of articulated grate members arranged in end-to-end relation and extending in the direction of fuel feed; means for supporting the first grate member of the series for angular movement about its forward end; a floating supporting link connected to the overfeed grate at the point of articulation between the last grate member of the series and the adjacent intermediate grate member; a second floating supporting link connected to the overfeed grate at the point of articulation between two of the intermediate grate members; and rocker mechanism connected to the overfeed grate at at least two remaining points of articulation for moving the grate members angularly with respect to the fuel-supporting surface.

15. In a stoker whereon the fuel bed moves in a single general direction from the front to the rear, the combination of an underfeed section comprising alternately-disposed retorts and tuyère rows which discharge the fuel bed in a more advanced state of combustion from the rear ends of the tuyère rows and a less advanced state of combustion from the rear ends of the retorts; a movable overfeed section having its forward end disposed to receive the fuel bed discharging from the underfeed section and both sections presenting under all conditions of operation an unbroken fuel-supporting surface; said overfeed section comprising a series of movably articulated grate members arranged in end-to-end relation and extending in the direction of fuel feed; means for supporting the first grate member of the series for angular movement about its forward end; floating links for supporting the overfeed grate; driving links for supporting and moving the overfeed grate; the floating links and the driving links being connected to the grate members forming the overfeed grate at alternate points of articulation considered in the direction of fuel feed; means for moving said driving links; and means providing for variation in the motion of said driving links.

16. In a stoker comprising stationary and movable structure and whereon the fuel bed moves in a single general direction from the front to the rear, the combination of an underfeed section comprising downwardly-inclined and alternately-disposed retorts and tuyère rows arranged to discharge a fuel bed in a more advanced state of combustion from the rear ends of the tuyère rows and a less advanced state of combustion from the rear ends of the retorts; a downwardly-inclined overfeed section having its forward end constructed and arranged to receive the fuel bed discharging from the underfeed section and both sections presenting under all conditions of operation an unbroken fuel-supporting surface; said overfeed section comprising a series of grate members pivotally connected together in end-to-end relation and extending in the direction of fuel feed; pivotal anchorage means arranged between one of the grate members and said stationary structure; supporting guide means carried by said stationary structure and having an inclined guide surface for the discharge end of the last grate member, the inclination of said surface being steeper than the inclination of the overfeed section and the last grate member having at least the part of its fuel-supporting surface adjacent to its discharge end more steeply inclined to provide a pushing surface; driving members associated with at least two of the series pivotal connections; each of the driving members being movable alternately in opposite directions so as to have components of motion normal to the general direction of fuel feed; and means for moving successive driving members simultaneously in opposite directions.

17. In a stoker whereon the fuel bed moves in a single general direction from the front to the rear, the combination of an underfeed section comprising alternately-disposed retorts and tuyère rows which discharge a fuel bed in a more advanced state of combustion from the rear ends of the tuyère rows and a less advanced state of combustion from the rear ends of the retorts; said underfeed section having a substantially vertical abutment surface at its discharge end; a movable overfeed section having its forward end continuously disposed to receive the fuel bed discharging from the underfeed section and both sections presenting under all conditions of operation an unbroken fuel-supporting surface; said overfeed section comprising a series of grate members connected in end-to-end relation so as to provide relative angular movement and extending in the general direction of fuel feed, the first grate member having its forward end extending beneath said substantially vertical abutment surface; and means for supporting and moving the overfeed section including means for anchoring one grate member, means for supporting the remaining grate members for movement bodily in the direction of fuel feed, and means for imparting angular movement to some of the grate members including the anchored grate member, whereby the fuel supporting portions of all of the grate members move bodily in the general direction of fuel feed due to expansion and contraction in the length of the overfeed section incident to said angular movements.

18. In a stoker whereon the fuel bed moves in a single general direction from the front to the rear, the combination of an underfeed section comprising alternately-disposed retorts and tuyère rows which discharge the fuel bed in a more advanced state of combustion from the rear ends of the tuyère rows and a less advanced state of combustion from the rear ends of the retorts; a movable overfeed grate section having its forward end continuously disposed to receive the fuel bed discharging from the underfeed section and both sections presenting under all conditions of operation an unbroken fuel-supporting surface; said overfeed section comprising a series of grate members pivotally connected together in end-to-end relation and extending in the direction of the fuel feed with the axes of their pivotal connections disposed horizontally and transversely of the direction of fuel feed; overlapping members provided at the discharge end of the underfeed section and at the discharge end of each of the pivotally connected grate members, except the last grate member, for overlapping the forward ends of adjacent grate members; and means for supporting and moving the overfeed section including means for anchoring one grate member, means for supporting the remaining grate members for movement bodily in the direction of fuel feed, and means for imparting angular movement to some of the grate members including the anchored grate member, whereby the grate members other than the anchored grate member move bodily in the general direction of fuel feed due to expansion and contraction in length of the overfeed section incident to such angular movements.

In testimony whereof, I have hereunto subscribed my name this 1st day of February, 1929.

ROBERT A. FORESMAN.